United States Patent [19]
Weng et al.

[11] Patent Number: 6,044,389
[45] Date of Patent: Mar. 28, 2000

[54] SYSTEM FOR COMPUTING THE MULTIPLICATIVE INVERSE OF A FIELD ELEMENT FOR GALOIS FIELDS WITHOUT USING TABLES

[75] Inventors: Lih-Jyh Weng, Needham; Ba-Zhong Shen, Shrewsbury, both of Mass.

[73] Assignee: Quantum Corporation, Milpitas, Calif.

[21] Appl. No.: 08/999,038

[22] Filed: Dec. 29, 1997

[51] Int. Cl.[7] .................................................. G06F 7/00
[52] U.S. Cl. ............................................................ 708/492
[58] Field of Search .................................. 708/491–492, 708/620

[56] References Cited

U.S. PATENT DOCUMENTS

| | | | |
|---|---|---|---|
| 4,989,171 | 1/1991 | Hollmann | 708/492 |
| 5,689,452 | 11/1997 | Cameron | 708/492 |
| 5,812,438 | 9/1998 | Lan et al. | 708/492 |

*Primary Examiner*—Tan V. Mai
*Attorney, Agent, or Firm*—Cesari and McKenna, LLP

[57] ABSTRACT

A system for determining the multiplicative inverse of an element of $GF(2^m)$ by raising the element to the power $2^m-2$. The system may raise the element $\alpha^j$ to the power $2^m-2$ by repeatedly multiplying the element by itself $2^m-3$ times. Alternatively, the system may produce the exponent $2^m-2$ as the sum of:

$$2^{m-1}+2^{m-2}+\ldots+2^3+2^2+2^1$$

and thus $(\alpha^j)_{2^m-2}$ as $$(\alpha^j)^{2^{m-1}}*(\alpha^j)^{2^{m-2}}*\ldots*(\alpha^j)^{2^3}*(\alpha^j)^{2^2}*(\alpha^j)^2$$

The system may iteratively square $\alpha^j$ to produce the various factors $(\alpha^j)^{2^{m-1}}*(\alpha^j)^{2^{m-2}}*\ldots*(\alpha^j)^2$ and, using a single multiplier, multiply and accumulate the results. Alternatively, the system may use a plurality of circuits operating in parallel and simultaneously raise the element $\alpha^j$ to the powers $2^{m-1}, 2^{m-2} \ldots 2$ to produce the factors, and use a plurality of tiered multipliers to multiply the factors together. The system may instead raise the element $\alpha^j$ to the power $2^m-2$ using a relatively small number of "stages," by producing the exponent $2^m-1$ as a combination of various products and sums. The products are implemented by raising the appropriate Galois Field elements to powers of 2 and the sums are implement by multiplying elements together. The system implemented in this manner includes in a first stage circuits that in parallel raise the element $\alpha^j$ to various powers of 2; in a second stage multipliers that selectively combine the results produced by the first stage; and in succeeding stages circuits that raise selected products produced in the preceding stages to various powers of 2 and multipliers that selectively combine the elements produced in the preceding stages. For those $GF(2^m)$ in which the elements can be represented by (m+1)-bit symbols, the system raises elements to powers of two by permuting the bits of the (m+1)-bit symbols and multiplies two elements together as (m+1)-bit symbols by cyclically shifting copies of one of the (m+1)-bit symbols, exclusive-OR'ing the bits of the shifted copies with the bits of the other (m+1)-bit symbol and summing the results.

18 Claims, 6 Drawing Sheets

| Symbol Size M | Circuit | Number of Multipliers | Number of power-of-2 circuits | Delay Cycles |
|---|---|---|---|---|
| 2 | 2 | 0 | 1 | 1 |
| 3 | 4//2 | 1 | 2 | 2 |
| 4 | (8//4) //2 | 2 | 3 | 3 |
| 5 | (4//2)→(4//1) | 2 | 3 | 4 |
| 6 | [(8//4)→(4//1)] //2 | 3 | 4 | 5 |
| 7 | (16//2)→[(4//2) //1] | 3 | 4 | 5 |
| 8 | {[(32//4)→{(4//2) //1} //2 | 4 | 5 | 6 |
| 9 | (4//2)→(4//1)→(16//1) | 3 | 4 | 6 |
| 10 | [(8//4) //2]→[(64//8) //1] | 4 | 5 | 6 |
| 11 | {[(16//8)//4]→[(64//8)//1]}//2 | 5 | 5 | 7 |
| 12 | [(32//8) // (4//2)]→[(64//16) //(8//1)] | 6 | 7 | 6 |
| 13 | {[(64//8) //2]→[(64//16) //(2//1)]} //2048 | 6 | 7 | 7 |
| 14 | {(4//2)→(4//1)→[(512//16) //1]} //512 | 5 | 6 | 8 |
| 15 | {(4//2)→(8//2)→[(512//16) //1}//(512//2) | 6 | 8 | 8 |
| 16 | {(8//4)→(8//2)→[(512//16) //1}//[(1024//4) //4) //2] | 7 | 9 | 8 |
| 17 | (4//2)→(4//1)→(16//1)→(256//1) | 4 | 5 | 8 |
| 18 | [(8//4)→(4//1)→(16//1)→(256//1)] //2 | 5 | 6 | 9 |

*FIG. 5*

| Symbol Size M | Circuit | Number of Multipliers | Number of power-of-2 circuits | Delay Cycles |
|---|---|---|---|---|
| 19 | [(16//8)→(4//1)→(16//1)→(256//1)] //(4112) | 6 | 7 | 9 |
| 20 | [(32//16)→(4//1)→(16//1)→(256//1)] //[8//4) //2] | 7 | 8 | 9 |
| 21 | [(64//32)→(4//1)→(16//1)→(256//1)] //[(16//8) //(4//2)] | 8 | 9 | 9 |
| 22 | {(4//2)→(4//1)→[((131072//8192)//(256//16)) //]}//8192 | 7 | 8 | 9 |
| 23 | {(4112)→(16//1)→[((65536//16384)//(256//16)]→//1}//8192 | 7 | 8 | 9 |
| 24 | {(8//4)→(16//1)→[((65536//16384)//(256//64)) //1} //[32//16) //→2] | 9 | 10 | 9 |
| 25 | {(2//1)→{(512//128)//1}→[(16384//1024)//(32//8)//1]} //2//1 | 9 | 8 | 10 |
| 26 | {(4//1)→{(512//128)//1]→[(16384//1024)//(32//8) //1]} //8 | 8 | 9 | 10 |
| 27 | {(4//2)→(4//1)→(16//1)→[(262144//512)//1]} //(512//262144) | 7 | 8 | 10 |
| 28 | [(8//4)//2]→[(64//8)//]→[(262144//512)//1] | 6 | 7 | 9 |

FIG. 5 (continued)

| Symbol Size M | Circuit | Number of Multipliers | Number of power-of-2 circuits | Delay Cycles |
|---|---|---|---|---|
| 2 | 2 | 0 | 1 | 0 |
| 4 | (8//4) //2 | 2 | 3 | 2 |
| 10 | [(8//4) //2]→[(64//8) //1] | 4 | 5 | 4 |
| 12 | [(32//8) // (4//2)]→[(64//16) //(8//1)] | 5 | 5 | 5 |
| 18 | [(8//4)→(4//1)→(16//1)→(256//1)] //2 | 5 | 6 | 5 |
| 28 | [(8//4)//2]→[(64//8)//]→[(262144//512)//1] | 6 | 7 | 6 |

SYSTEM FOR COMPUTING THE MULTIPLICATIVE INVERSE OF A FIELD ELEMENT FOR GALOIS FIELDS WITHOUT USING TABLES

FIELD OF THE INVENTION

This invention relates generally to data processing systems and, more particularly, to systems that manipulate data codewords that are encoded using codes based on Galois fields.

BACKGROUND OF THE INVENTION

Data stored on magnetic media, such as a magnetic disks, are typically stored in encoded form, so that errors in the stored data can possibly be corrected. The errors may occur, for example, because of inter-symbol interference, a defect in the disk, or noise. As the density of the data stored on the disk increases, more errors are likely, and the system is required to correct greater numbers of errors, which include greater numbers of burst errors. A burst error is typically defined as a contiguous number of symbols in which the first symbol and the last symbol are erroneous. The speed with which the system corrects the errors, including the burst errors, is important to the overall speed with which the system processes the data.

Prior to recording, multiple-bit data symbols are encoded using an error correction code (ECC). When the data symbols are retrieved from the disk and demodulated, the ECC is employed to, as the name implies, correct the erroneous data.

Specifically, before a string of k data symbols is written to a disk, it is mathematically encoded using an (n, k) ECC to form n-k ECC symbols. The ECC symbols are then appended to the data string to form an n-symbol error correction code word, which is then written to, or stored, on the disk. When the data are read from the disk, the code words containing the data symbols and ECC symbols are retrieved and mathematically decoded. During decoding, errors in the data are detected and, if possible, corrected through manipulation of the ECC symbols [for a detailed description of decoding see, Peterson and Weldon, *Error Correction Codes,* 2nd Ed. MIT Press, 1972].

To correct multiple errors in strings of data symbols, the system typically uses an ECC that efficiently and effectively utilizes the various mathematical properties of sets of symbols known as Galois fields. Galois fields are represented "GF($P^M$)", where "P" is a prime number and "M" can be thought of as the number of digits, base "P", in each element or symbol in the field. P usually has the value 2 in digital computer and disk drive applications and, therefore, M is the number of bits in each symbol. The ECC's commonly used with the Galois Fields are Reed Solomon codes or BCH codes.

Reed Solomon and BCH decoding operations involve a plurality of division operations. One method of dividing a Galois field element A by a Galois field element B is to determine the multiplicative inverse, $B^{-1}$, of B and then multiply A by $B^{-1}$. In prior systems a look-up table is typically used to determine the multiplicative inverse, so that the system need not perform a known, time-consuming series of steps to produce the inverse. The look-up table contains $2^m-1$ entries. For systems using GF($2^8$), that is, using 8-bit symbols, the look-up table has $2^8-1$. or 255, entries.

As the density of the data increases, larger Galois Fields are used to produce the longer data codewords that are required to protect the data. Consequently, larger look-up tables are required to provide the multiplicative inverses. For GF($2^{10}$) or GF($2^{12}$), for example, the required tables have 1023 and 4095 entries, respectively. Each of the tables thus consumes a great deal of storage space, which for some systems is too expensive and/or impractical. Accordingly, what is needed is a mechanism that, without being overly complex, relatively quickly calculates the multiplicative inverses, and thus, eliminates the need for the look-up table.

SUMMARY OF THE INVENTION

A system for determining the multiplicative inverse of an element of GF($2^m$) by raising the element to the power $2^m-2$. The system takes advantage of the fact that all non-zero elements of GF($2^m$) are roots of the polynomial $x^{2^m}-x=0$ or $x^{2^m-1}-1=0$. and thus, for any $\alpha^j \in GF(2^m)$, $$(\alpha^j)^{2^m-1}=1 \qquad \text{eqn. 1}$$

Multiplying both sides of equation 1 by $(\alpha^j)^{-1}$:

$$(\alpha^j)^{-1}*(\alpha^j)^{2^m-1}=(\alpha^j)^{-1}*1$$

where "*" represents multiplication, gives the inverse of $\alpha^j$ as $$\alpha^{-j}=(\alpha^j)^{2^m-2} \qquad \text{eqn. 2}$$

The system may raise the element $\alpha^j$ to the power $2^m-2$ by repeatedly multiplying the element by itself $2^m-3$ times. Alternatively, the system may produce the exponent $2^m-2$ as the sum of:

$$2^{m-1}+2^{m-2}+\ldots+2^3+2^2+2^1$$

and thus $(\alpha^j)^{2^m-2}$ as $$(\alpha^j)^{2^{m-1}}*(\alpha^j)^{2^{m-2}}*\ldots*(\alpha^j)^{2^3}*(\alpha^j)^{2^2}*(\alpha^j)^2 \qquad \text{eqn. 3}$$

To do this, the system may iteratively square $\alpha^j$ to produce the various factors of eqn. 3 and, using a single multiplier, multiply and accumulate the results. This implementation of the system is not complex, but requires m-1 time-consuming multiplication cycles. Alternatively, the system may use a plurality of circuits operating in parallel and simultaneously raise the element $\alpha^j$ to the powers $2^{m-1}, 2^{m-2}$ and so forth, and a plurality of tiered multipliers to then multiply the factors together. This implementation is fast, but includes a relatively large number of complex multiplier circuits.

Preferably, the system raises the element CO to the power $2^m-2$ using a relatively small number of "stages," as a best trade-off between complexity and delay. To do this the system produces the exponent $2^m-2$ as a combination of various products and sums. The products are implemented by raising the appropriate elements to powers of 2 and the sums are implement by multiplying elements together. The system thus includes a first stage in which circuits in parallel raise the element $\alpha^j$ to various powers of 2; a second stage in which multipliers selectively combine the results produced in the first stage; and one or more stages in which circuits raise selected products produced in the preceding stages to various powers of 2 and/or multipliers selectively combine the results produced in preceding stages. The system produces the inverses using a minimal number of stages, each with at most one multiplier, such that the system includes relatively few multipliers and the associated delay is minimized.

BRIEF DESCRIPTION OF THE DRAWINGS

The invention description below refers to the accompanying drawings, of which:

FIG. 5 is a table that describes, for various Galois Fields $GF(2^m)$, hardware configurations for the system depicted in FIG. 4;

DETAILED DESCRIPTION OF AN ILLUSTRATIVE EMBODIMENT

Figure 1:
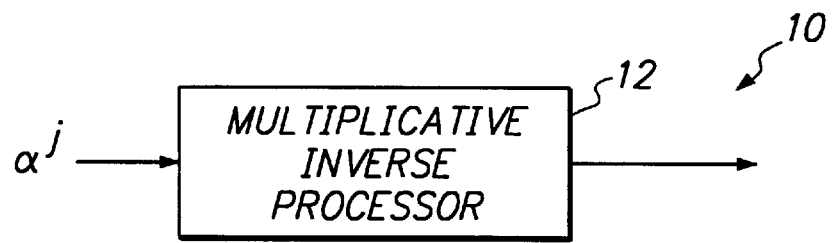
FIG. 1 is a block diagram of a system constructed in accordance with the invention.

Referring now to FIG. 1, a system 10 for determining the multiplicative inverse of $\alpha^j \in GF(2^m)$ includes a processor 12 that raises the element to the power $2^m-2$. The result is the inverse of $\alpha^j$, $\alpha^{-j}=(\alpha^j)_{2^m-2}$.

The system 10 takes advantage of the fact that every non-zero element of $GF(2^m)$ is a root of $x^{2^m}-x=0$, or $x^{2^m-1}-1=0$. Thus, for any non-zero element $\alpha^j$, $$(\alpha^j)^{2^m-1}=1 \qquad \text{eqn. 1}$$

Multiplying both sides of equation 1 by $(\alpha^j)^{-1}$:

$$(\alpha^j)^{-1}*(\alpha^j)^{2^m-1}=(\alpha^j)^{-1}*1$$

where "*" represents multiplication, produces:

$$(\alpha^j)^{2^m-2}=\alpha^{-j} \qquad \text{eqn. 2}$$

The processor 12 that raises $\alpha^j$ to the $2^m-2$ power may be implemented in hardware, software or firmware. We discuss below various hardware configurations and their associated delays. All of the hardware configurations, as well as any software or firmware embodiments of the system are viable alternatives to using a $2^m-1$ element look-up table to determine the multiplicative inverse of $\alpha^j$. In most error correction systems there is a trade-off between delay and system complexity, and we discuss below various configurations that optimize that trade-off.

One method for producing $(\alpha^j)^{2^m-2}$ is to multiply $\alpha^j$ by itself $2^m-3$ times. For this method, the processor 12 consists of a single multiplier. The delay, however, is $2^m-3$ multiplier cycles, which presumably is too long for most error correction systems.

Another method for producing the inverse is to treat the exponent $2^m-2$ as the sum of:

$$2^{m-1}+2^{m-2}+\ldots+2^3+2^2+2^1$$

and thus, $(\alpha^j)^{2^m-2}$ may be produced as the product:

$$(\alpha^j)^{2^{m-1}}*(\alpha^j)^{2^{m-2}*}\ldots *(\alpha^j)^{2^3}*(\alpha^j)^{2^2}*(\alpha^j)^{2^1} \qquad \text{eqn. 3}$$

as discussed below with reference to FIGS. 2 and 3.

Figure 2:
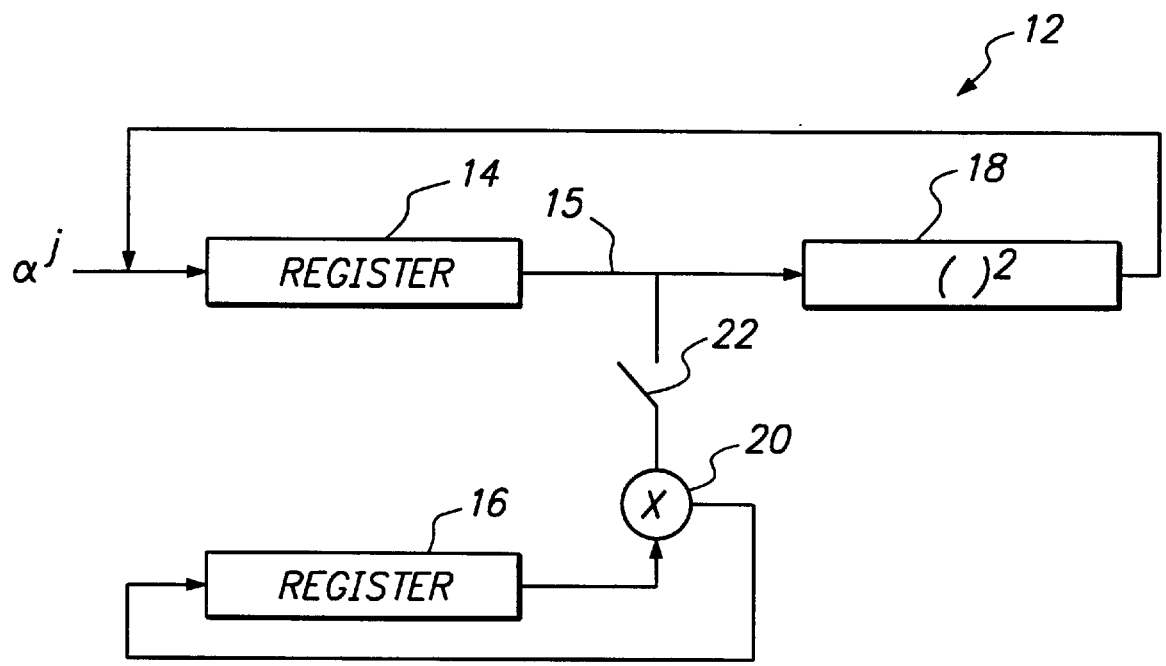
FIG. 2 is a more detailed functional block diagram of an embodiment of the system of FIG. 1.

Referring now to FIG. 2, the processor 12 includes two registers 14 and 16, a squaring circuit 18 and a multiplier 20 that connects to the output line 15 of the register 14 through a switch 22. The circuit produces $(\alpha^j)^{2^m-2}$ as:

$$(\alpha^j)^{2^{m-1}}*(\alpha^j)^{2^{m-2}*}\ldots *(\alpha^j)^{2^3}*(\alpha^j)^{2^2}*(\alpha^j)^{2^1}$$

by repeatedly squaring $\alpha^j$ to iteratively produce the factors of equation 3 and multiplying the factors together as they are produced. At time t=0, $\alpha^j$ is loaded into register 14; a symbol of all ones is loaded into register 16; and the switch 22 is open. The contents of register 14 are applied to the squaring circuit 18 and the result, $(\alpha^j)^2$, is then fed back to the register 14 at time t=1. We measure time in cycles that correspond in duration to the longest time it takes the system to perform a desired operation. Thus, time is measured in cycles that correspond to the time it takes to multiply two m-bit symbols.

Next, the switch 22 is closed and the contents of the register 14 are applied to both the squaring circuit 18 and the multiplier 20. The squaring circuit 18 produces $(\alpha^j)^{2^2}$ and the multiplier 20 multiplies $(\alpha^j)^2$ by the contents of the register 16, i.e., by an m-bit symbol of all ones. The contents of the registers 14 and 16 are then updated to $(\alpha^j)^{2^2}$ and $(\alpha^j)^2$, respectively, at time t=3. The element $(\alpha^j)^{2^2}$ is next applied to the squaring circuit 18 and to the multiplier 20. The squaring circuit produces $(\alpha^j)^{2^3}$ and the multiplier produces $(\alpha^j)^2(\alpha^j)^{2^2}$, and the registers 14 and 16 are appropriately updated. The contents of the register 14 are repeatedly squared to produce the remaining factors of equation 3 and the factors are multiplied, respectively, m-3 more times, to produce $(\alpha^j)^{2^m-2}$.

The total delay to produce the multiplicative inverse is thus m-1 cycles. This hardware implementation is faster than using a single multiplier, but is still generally too slow for use in many error correction systems. This implementation, however, works well for systems that anticipate the need for particular multiplicative inverses by at least m-1 cycles.

Figure 3:
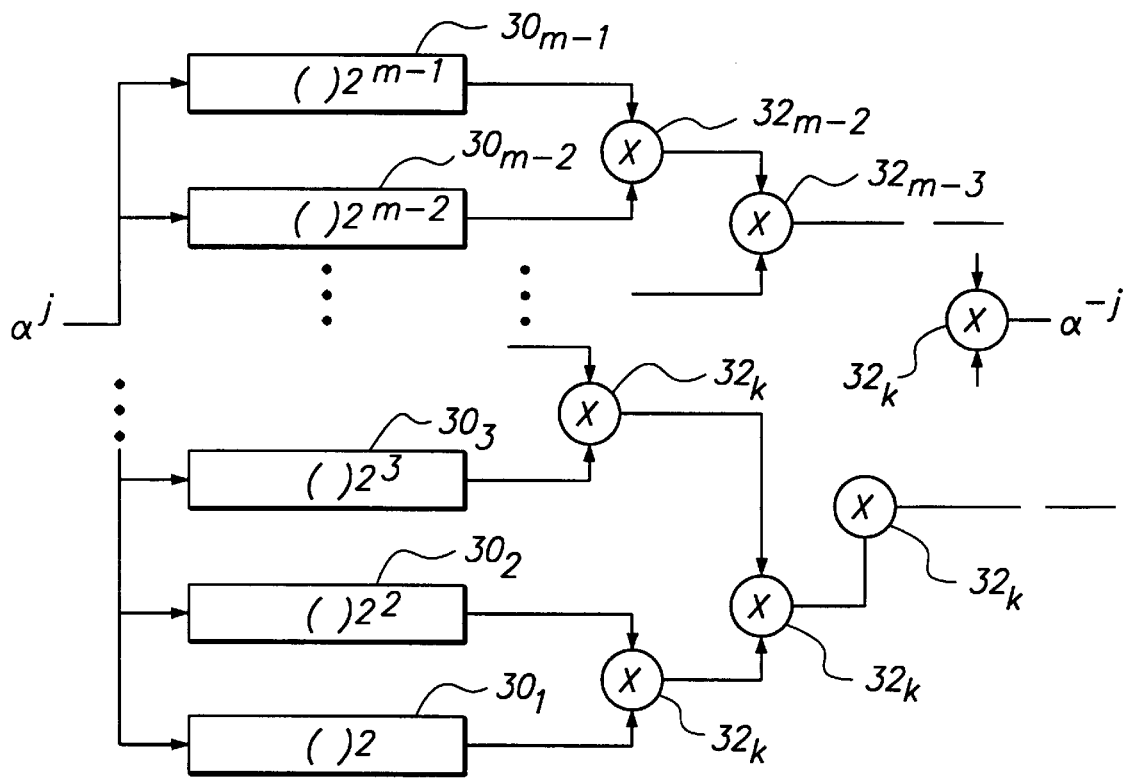
FIG. 3 is a functional block diagram of an alternative embodiment of the system of FIG. 1.

Referring to FIG. 3, the processor 12 is implemented using m-1 circuits $30_i$, i=1, 2 . . . m-1, for raising $\alpha^j$ to powers of two, and m-2 tiered multipliers $32_k$, k=1, 2 . . . m-2, for multiplying together the results produced by the circuits $30_i$. The delay associated with this circuit is $1+\lceil \log_2(m-2) \rceil$ cycles, where [ ] represents the ceiling function. The delay of 1 cycle is associated with the circuits $30_i$ that raise $\alpha^j$ to the powers of two, and the delay of $\lceil\log_2(m-2)\rceil$ cycles is associated with the multipliers $32_k$. This lo implementation is fast, however, with m-2 multipliers, it may be too complex for certain error correction systems.

We have determined that hardware configurations with minimal delay and acceptable complexity can be designed by treating the exponent $2^m-2$ as a series of products and sums that require a minimum number of the multipliers. Circuits that raise the elements to various powers of two, i.e., the "power-of-two circuits," produce the products, since the exponents multiply, and the multipliers produce the sums, since the exponents of the elements add. We refer to the series of operations that produce the various products and sums as "stages."

Figure 4:
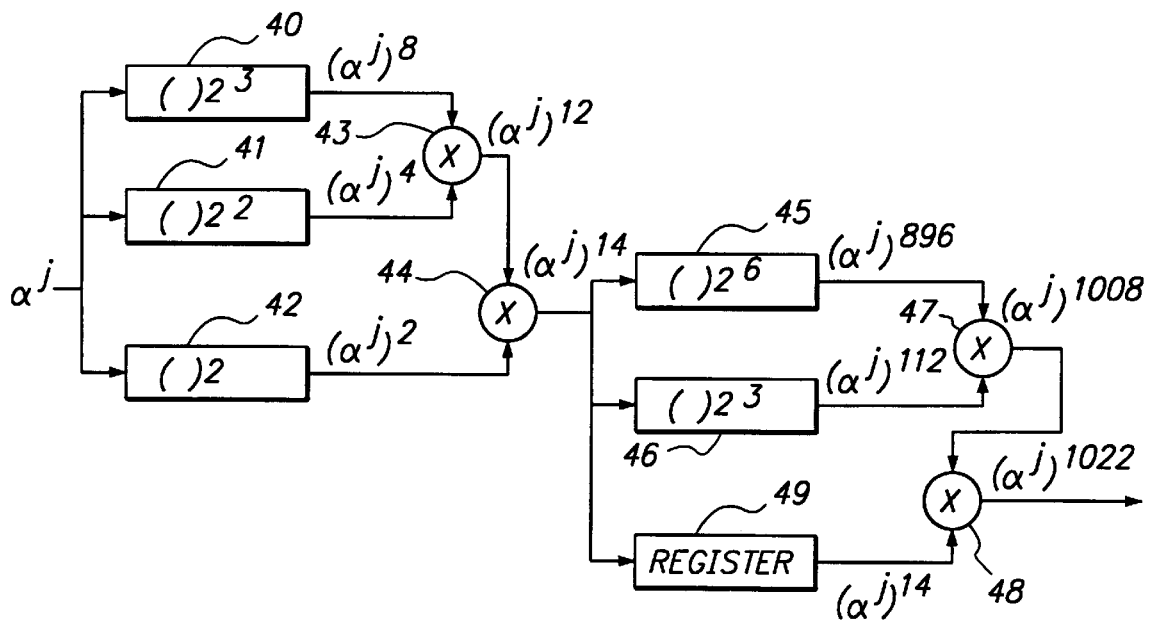
FIG. 4 is a functional block diagram of another embodiment of the system of FIG. 1.

As an example, we refer to FIG. 4. The inverse of $\alpha^j \in GF(2^{10})$ is determined in six stages. In a first stage the element $\alpha^j$ is simultaneously raised to the powers $2^3$ and $2^2$ in circuits 40 and 41 and to the power 2 in squaring circuit 42. In a second stage multiplier 43 multiplies $(\alpha^j)$ and $(\alpha^j)^{2^2}$ to produce $(\alpha^j)^{8+4}=(\alpha^j)^{12}$. In a third stage the product is multiplied in multiplier 44 by (Cd)2 to produce (&)14. which is applied to power-of-two circuits 45 and 46 and register 49. The circuits 45 and 46 produce $(\alpha^j)^{896}$ and $(\alpha^j)^{112}$, respectively, as part of the fourth stage. In the fifth stage a multiplier 47 multiplies the two values together, to produce $(\alpha^{1008})$. In the sixth stage, a multiplier 48 multiplies the product by the contents of the register 49, to produce $(\alpha^j)^{1022}=(\alpha^j)^{-1}$. The associated delay is 6 cycles, one for each of the stages, and the system includes only four multipliers. The hardware configuration thus produces the multiplicative inverses with a combination of essentially minimal complexity and minimal delay.

FIG. 5 is a table that details configurations of the processor 12 for GF($2^m$), m<29. The notation || is used to denote raising an element to the associated powers of two in parallel and the multiplication of the results, and the notation → refers to applying the result of the previous operation(s) to a next operation or set of parallel operations. As desired, similar hardware configurations can be determined for m>29.

Using the example of FIG. 4, consider the table entry for GF($2^{10}$):

$$[(8\|4)\|2]\rightarrow[(64\|8)\|1]$$

The circuits 40 and 41 and the multiplier 43 perform 8||4 by raising $\alpha^j$ to the powers $2^3$ and $2^2$ and multiplying the results together, to produce the product $\alpha^{12}$. The multiplier 44, performs ||2 by multiplying together the product produced by multiplier 43 and the element $(\alpha^j)^2$ produced by squaring circuit 42, to produce the product $\alpha^{14}$. The circuits 45 and 46 and the multiplier 47 perform 64|51 8. and the multiplier 48 performs ||1 by multiplying together the product produced by multiplier 47 and the contents of register 49.

For even values of m, the multiplicative inverse of an element of GF($2^m$) may instead be produced by first raising the element to the power t*k, where $t=2^{m/2}-1$ and k is any integer, and then essentially determining the inverse of $(\alpha^j)^{t*k}$, which is $[(\alpha^j)^{t*k}]^{2/2}$. This can be shown by considering that $$[(\alpha^j)^{t*k}]^{2^{m/2}}=[(\alpha^j)^{t*k}]^{t+1}=(\alpha^j)^{t*k*(t+2-1)}=\alpha^{j*k*(t+2)}*(\alpha^j)^{-t*k}$$

The exponent of the first term is zero mod $2^m-1$ because it includes ($2^m-1$) as a factor:

$$j*[t*k*(t+2)]=j*[((2^{m/2}-1)*k)*(2^{m/2}+1)]=j*(2^m-1)*k$$

Accordingly, $$\alpha^{j*[t*k*(t+2)]}=\alpha^0=1$$

and thus $$[(\alpha^j)^{t*k}]^{2^{m/2}}=1*(\alpha^j)^{-t*k}$$

Figure 6:
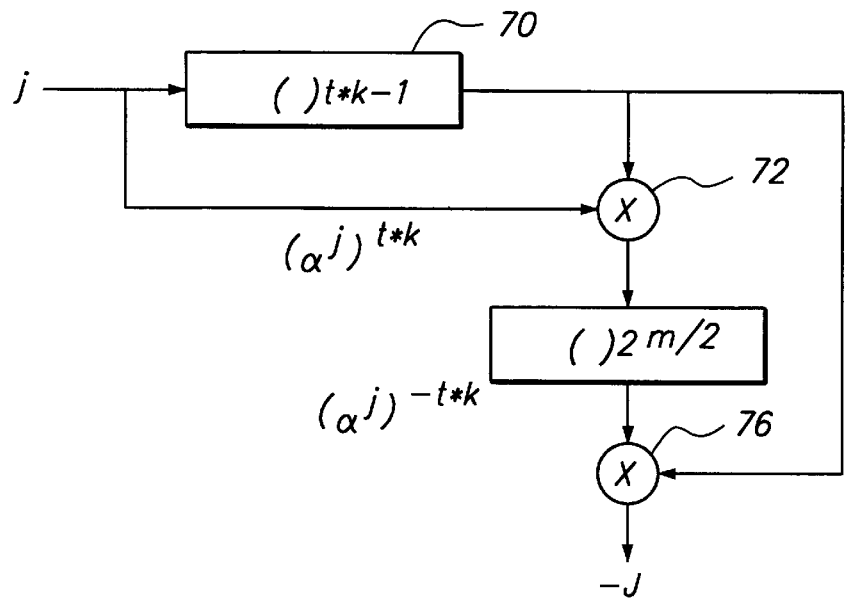
FIG. 6 is a functional block diagram of an alternative embodiment of the system of FIG. 4 for Galois Fields $GF(2^m)$, where m is even.

The hardware configuration for determining the inverse of $\alpha^j$ using this method is depicted in block diagram form in FIG. 6. The element $\alpha^j$ is applied to a circuit 70 that raises $\alpha^j$ to the t*k−1 power, to produce $(\alpha^j)^{t*k-1}$. The result is then multiplied by $\alpha^j$ in multiplier 72, to produce the product $(\alpha^j)^{t*k}$. This product is next raised to the power $2^{m/2}$, or t+1, to produce $(\alpha^j)^{-t*k}$ and this result is multiplied in multiplier 76 by the quantity $(\alpha^j)^{t*k-1}$ produced by the circuit 70. The result is $(\alpha^j)^{-1}$.

The system designer is presented with the problem of determining a fast and not overly complex circuit for raising $\alpha^j$ to the t*k−1 power. For the even values of m included in the table of FIG. 5, we have determined that the hardware configurations included in the table each represent a better or at least as good trade-off of delay versus complexity for all values of m except m=12. For m=12, and k=1, the circuit 70 for raising $\alpha^j$ to the t*k−1 power is: $[(8\|4)\rightarrow(4\|1)]\|2$. This implementation of the circuit 70 together with the multipliers 72 and 76 and the circuit 74 produce the inverse of $\alpha^j$ with a delay of 8 cycles using a total of 5 multipliers and 5 power-of-two circuits. Using the hardware configuration of FIG. 6 instead of the configuration included in the table of FIG. 5, the number of multipliers is reduced from 6 to 5 and the delay is increased by only 2 cycles.

The hardware configurations for Galois Fields GF($2^m$) that can be generated by irreducible polynomials $$p(x)=x^m+x^{m-1}=x^{m-2}\ldots+x^2+x+1$$

can be further optimized by using (m+1)-bit representations of the m-bit elements. A paper by J. K. Wolf entitled "Efficient Circuits for multiplying in GF($2^m$) For Certain Values of m," published in *Discrete Mathematics* 106/107 (1992) pp. 497–502, discusses certain of these fields and is incorporated herein by reference. Co-pending U.S. patent application Ser. No. 08/786,894 entitled Modified Reed-Solomon Error Correction System Using (w+i+1)-Bit Representations of Symbols in GF($2^{w+i}$), which is assigned to a common assignee and is also incorporated herein by reference, discusses a greater number of these fields. The first few values of m are 2, 4, 10, 12, 18, 28 . . .

As described in the co-pending application, each symbol of these particular Galois Fields can be represented by one of two related (m+1)-bit symbols. It further describes how the operations of raising an element to a power of 2 or multiplying two elements can be readily performed as permutations and combinations of cyclic shifts of the associated (m+1)-bit symbols. Specifically, as discussed below and in greater detail in the co-pending application, an element is raised to a power of 2 by permuting the bits of the associated (m+1)-bit symbol. Two elements are multiplied together as (m+1)-bit symbols by cyclically shifting the bits of one of the (m+1)-bit symbols, exclusive -OR'ing the shifted symbols with the bits of the other (m+1)-bit symbol and summing the results. There is thus essentially no delay in raising an element to a power of two, and the delay is associated with the multiplication operation is significantly smaller than the delay associated with the corresponding operation performed using m-bit representations of the elements.

The (m+1)-bit symbols $c(x)=c_m x^m+c_{m-1}x^{m-1}+\ldots+c_2x^2+c_1x^1+c_0$ that represent the m-bit elements are hereinafter referred to by their coefficients or bits, namely, $$c(x)=c_m c_{m-1} c_{m-2} \ldots c_2 c_1 c_0$$

To raise a symbol c(x) to the power $2^j$, we define a permutation $$\pi_j(i)=i*2^j \bmod m+1$$

that produces the exponent of the coefficient of bit i of $[c(x)]^{2^j}$. To square an 11-bit representation of an element of GF($2^{10}$), for example, bit 10 of c(x) is permuted to bit i*2 mod m+1 or 10*2 mod 11=9 of $[c(x)]^2$ and so forth, such that $[c(x)]^2$ has coefficients:

$$c_5 c_{10} c_4 c_9 c_3 c_8 c_2 c_7 c_1 c_6 c_0$$

Multiplication of two (m+1)-bit symbols is performed by exclusive-OR'ing cyclically shifted copies of one of the symbols with the bits of the other symbol and summing the results. Thus, multiplication of two (m+1)-bit symbols is more easily and quickly performed than multiplication of two m-bit symbols.

For two symbols b(x) and d(x), where $$b(x) = b_{10}b_9b_8b_7b_6b_5b_4b_3b_2b_1b_0$$

and $$d(x) = d_{10}d_9d_8d_7d_6d_5d_4d_3d_2d_1d_0,$$

$$\begin{aligned}b(x)*d(x) = &\ b_0 * (d_{10}d_9d_8d_7d_6d_5d_4d_3d_2d_1d_0) + \\ &\ b_1 * (d_9d_8d_7d_6d_5d_4d_3d_2d_1d_0d_{10}) + \\ &\ b_2 * (d_8d_7d_6d_5d_4d_3d_2d_1d_0d_{10}d_9) + \\ &\ b_3 * (d_7d_6d_5d_4d_3d_2d_1d_0d_{10}d_9d_8) + \\ &\ b_4 * (d_6d_5d_4d_3d_2d_1d_0d_{10}d_9d_8d_7) + \\ &\ b_5 * (d_5d_4d_3d_2d_1d_0d_{10}d_9d_8d_7d_6) + \\ &\ b_6 * (d_4d_3d_2d_1d_0d_{10}d_9d_8d_7d_6d_5) + \\ &\ b_7 * (d_3d_2d_1d_0d_{10}d_9d_8d_7d_6d_5d_4) + \\ &\ b_8 * (d_2d_1d_0d_{10}d_9d_8d_7d_6d_5d_4d_3) + \\ &\ b_9 * (d_1d_0d_{10}d_9d_8d_7d_6d_5d_4d_3d_2) + \\ &\ b_{10} * (d_0d_{10}d_9d_8d_7d_6d_5d_4d_3d_2d_1)\end{aligned}$$

where "*" represents multiplication over GF(2). Note that the components of d(x) of each row above are cyclically shifted copies of each other. The symbols b(x) and d(x) can be interchanged, to achieve the same result.

If lower weight versions of the 11-bit representations, that is, the representations with the smaller number of 1s, are used for the multiplication operation, the operation involves a maximum of 5 cyclically shifted copies of a symbol since the shifted copies of d(x) that correspond to the zero-valued bits of b(x) need not be produced. Accordingly. the maximum number of modified symbols that must be added together is five. In contrast, multiplying two 10-bit symbols may require adding together up to 10 modified copies of one of the symbols. Further, the modifications to the 10-bit copies are typically more complex than cyclic shifts.

Using the (m+1)-bit representations, the delays associated with the various hardware configurations set forth in the table of FIG. 5 are reduced to the delays associated with the multiplication operations, because the permutations that raise elements to powers of 2 each have essentially no delay. For example, the delay associated with determining the inverse of an element of $GF(2^{10})$ is reduced from 6 cycles to 4 cycles when (m+1)-bit symbols are used. Further, the duration of each cycle is shorter since the (m+1)-bit multiplication operations for these Galois Fields are performed more quickly than the corresponding m-bit multiplications operations.

Figure 7:
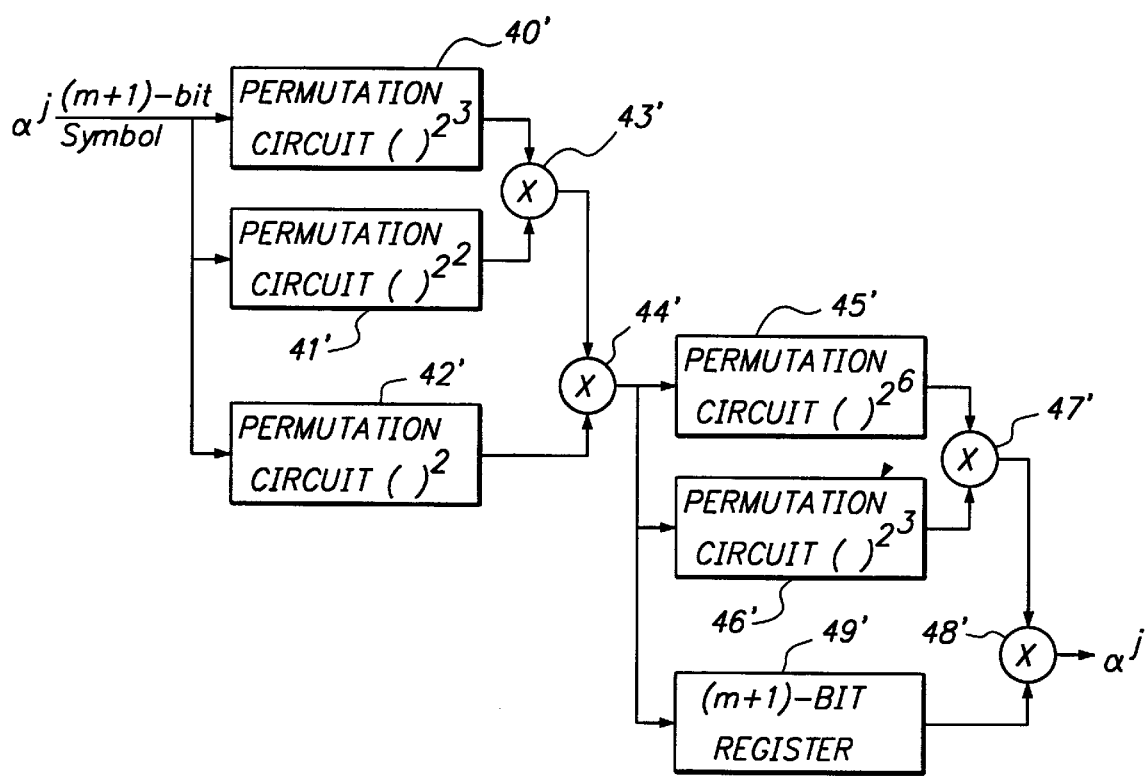
FIG. 7 is a functional block diagram of an alternative embodiment of the system of FIG. 4.

FIG. 7 depicts in block diagram form the system 10' for determining the multiplicative inverses in $GF(2^{10})$ using (m+1)-bit symbols. The (m+1)-bit symbol associated with cc is applied in parallel to permutation circuits 40', 41' and 42'. With essentially no delay, the circuits raise the element, respectively, to powers of $2^3$, $2^2$ and 2 by permuting the bits in accordance with $\pi_j(i)$. The (m+1)-bit symbols produced by permutation circuits 40' and 41' are multiplied together in multiplier 43', which cyclically shifts one of the (m+1)-bit symbols an appropriate number of times, exclusive-OR's the shifted bits with the bits of the other (m+1)-bit symbol and sums the results. The (m+1)-bit product produced by the multiplier 43' is then multiplied in multiplier 44' by the (m+1)-bit symbol produced by permutation circuit 42'.

The (m+1)-bit product produced by multiplier 44' is applied to permutation circuits 45' and 46'. With essentially no delay, the circuits raise the product to powers of $2^6$ and $2^3$, respectively, by permuting the bits of the (m+1)-bit symbol. The (m+1)-bit symbols produced by the permutation circuits 45' and 46' are then multiplied together in multiplier 47', by cyclically shifting the bits of one of the (m+1)-bit symbols, exclusive-OR'ing the shifted bits with bits of the other symbol and summing the results. The (m+1)-bit product produced by multiplier 47' is multiplied in multiplier 48' by the contents of register 49', that is, by the (m+')-bit product produced by multiplier 44', to produce the (m+1)-bit representation of $(\alpha^j)^{-1}$. As discussed in the co-pending patent application, the coefficients of the corresponding m-bit element of $GF(2^{10})$ are the bits $c_9, c_8 \ldots c_0$ or their complements, depending on whether $c_{10}$ is a 0 or a 1. The inverse of $\alpha^j$ is thus produced with a delay of only 4 cycles.

Figures 8, 9:
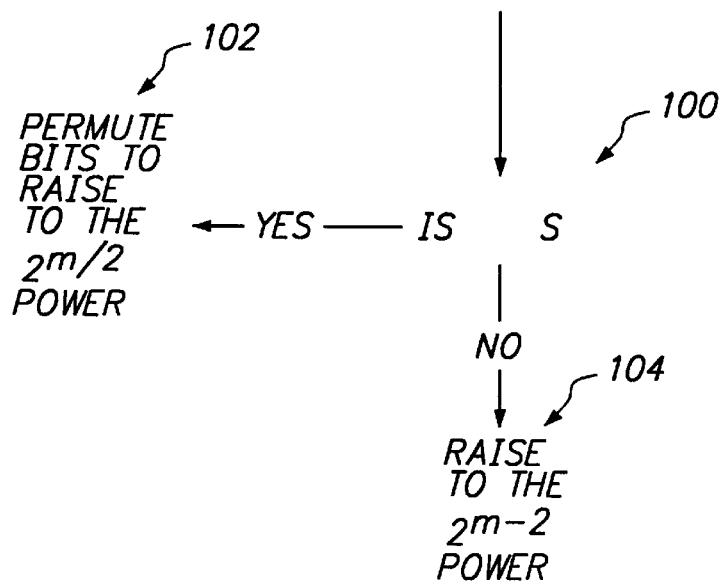
FIG. 8 is a table that describes alternate hardware configurations for systems using $GF(2^m)$ for certain values of m.
FIG. 9 is a flow chart of the operations of an alternative embodiment of the system of FIG. 7.

FIG. 8 is a table of the hardware configurations and the associated delays of systems that manipulate (m+1)-bit representations of the elements of $GF(2^m)$ for m=2, 4, 10, 12, 18 and 28. As desired, similar hardware configurations can be determined for applicable values of m>28.

For those field elements that are also elements of a subset "S" in which each element can be represented as $\alpha^{k*s}$, where $s=2^{m/2}-1$ and k is an integer, the multiplicative inverse can be determined by a single permutation. Accordingly, there is essentially no delay in producing these inverses. As discussed above, the inverse of an element $\alpha^j$ is $(\alpha^j)^{2^m-2}$. Specifically, with j=k*s, the exponent can be manipulated as follows:

$$\begin{aligned}k*s*(2^m - 2) &= k*s*[2^m - 1 - 1 + 2^{m/2} - 2^{m/2}] \\ &= k*s*[2^{m/2} + (2^m - 1) - (2^{m/s} + 1)] \\ &= k*s*2^{m/s} + k*s[(2^{m/2}+1)(2^{m/2}-1) - (2^{m/2}+1)] \\ &= k*s*2^{m/2} + k*s[(2^{m/2}+1)(2^{m/2}-1-1)] \\ &= k*s*2^{m/2} + k*[(2^{m/2}-1)(2^{m/2}+1)(2^{m/2}-2)] \\ &= k*s*2^{m/2} + k*(2^m-1)*(2^{m/2}-2)\end{aligned}$$

The second term of the exponent is zero, since in $GF(2^m)$ a factor of $2^m-1$ is equal to zero. Accordingly, the inverse of $\alpha^{k*s}$ is $[\alpha^{k*s}]^{2^{m/2}}$. The inverse is thus determined by raising the element to the power of $2^{m/2}$ which with (m+1)-bit symbols is performed by permuting the bits. If the coefficients of $\alpha^j$ are:

$$\alpha^{k*s} = \sum_{i=1}^{m} c_i x^i + c_0$$

the coefficients of the inverse $\alpha^{-k*s}$ are:

$$(\alpha^{k*s})^{2^{m/2}} = \sum_{i=1}^{m} c_i x^{i*2^{m/2}} + c_0 \equiv \sum_{i=1}^{m} c_i x^{m+1-i} + c_0 \bmod(x^{m+1}+1) \quad \text{eqn. 4}$$

Referring now to FIG. 9, the system in step 100 determines if an element $\alpha^j$ is an element of the subset S. If so, the system in step 102 determines the inverse of $\alpha^j$ by permuting the bits of the associated (m+1)-bit representation in accordance with equation 4. For the elements of the subset S, the system thus determines the inverses with essentially no delay. For an element of the Galois Field that is not an element of the subset, and thus, cannot be represented as $\alpha^{k*s}$, the system in step 104 determines the inverse by raising the (m+1)-bit representation of the element to the $2^m-2$ power using, for example, the appropriate hardware configuration included in the table of FIG. 8.

The systems that use the (m+1)-bit symbols determine the multiplicative inverses with minimum delay, using a minimal number of (m+1)-bit multipliers. Further, the (m+1)-bit multipliers are less complex than m-bit multipliers, and thus, such systems represent an optimum combination of minimum complexity and minimal delay. The systems that use m-bit symbols discussed above also represent optimal trade-offs of delay versus complexity, and similarly eliminate the need for look-up tables.

What is claimed is:

1. A system for determining a multiplicative inverse of an element $\alpha^j$ of Galois Field GF($2^m$), the system including:

A. means for raising the element $\alpha^j$ to the powers $2^i$, i=1,2, ... m−1 to produce m−1 elements $(\alpha^j)^{2^{m-1}}$, $(\alpha^j)^{2^{m-2}}$, ... $(\alpha^j)^{2^2}$, $(\alpha^j)^2$ B. means for combining the m−1 elements to produce the product: $(\alpha^j)^{2^m-1}*(\alpha^j)^{2^m-2*} \ldots *(\alpha^j)^{2^2}*(\alpha^j)^2=(\alpha^j)^{2^m-2}$.

2. The system of claim 1 wherein the means for combining includes a plurality of multipliers that are arranged in tiers, with the first tier of multipliers multiplying pairs of the m−1 elements, and succeeding tiers of multipliers multiplying pairs of the products produced by the preceding tier of multipliers.

3. A system for determining a multiplicative inverse of an element $\alpha^j$ of Galois Field GF($2^m$), the system including:

A. one or more power-of-two circuits for raising the element $\alpha^j$ to powers of two;

B. one or more multipliers for multiplying selected pairs of the results produced by the power-of-two circuits;

C. one or more additional power-of-two circuits for raising selected products produced by the one or more multipliers to powers of two; and D. one or more additional multipliers for producing $(\alpha^j)^{2^m-2}$, the additional multipliers multiplying i. selected pairs of the results produced by the additional power-of-two circuits;

ii. selected results produced by the power-of-two circuits and selected products produced by the one or more multipliers; and iii. selected results produced by the additional power-of-two circuits and selected products produced by one or more of the additional multipliers.

4. The system of claim 3 wherein:

a. selected power-of two circuits, selected one or more multipliers, selected additional power-of two circuits, and selected additional multipliers produce $(\alpha^j)^{t*k}$, b. selected additional power-of two circuits and selected additional multipliers produce $[(\alpha^j)^{t*k}]^{2^{m/2}}=(\alpha^j)^{-t*k}$, and c. selected additional power-of two circuits and selected additional multipliers produce $(\alpha^j)^{-t*k}*(\alpha^j)^{t*k-1}=(\alpha^j)^{-1}$.

5. A system for producing multiplicative inverses for elements $\alpha^j$ of GF($2^m$), the system including:

A. one or more permutation circuits for raising the element $\alpha^j$ to powers of two by permuting bits of a (m+1)-bit representation of the element $\alpha$;

B. one or more (m+1)-bit multipliers for multiplying selected pairs of the results produced by the permutation circuits;

C. additional permutation circuits for raising selected products produced by the one or more multipliers to powers of two; and D. one or more additional (m+1)-bit multipliers for producing $(\alpha^j)^{2^m-2}$, the additional (m+1)-bit multipliers multiplying i. selected pairs of the results produced by the additional permutation circuits;

ii. selected results produced by one or more of the permutation circuits and selected products produced by the one or more (m+1)-bit multipliers;

iii. selected results produced by the additional permutation circuits and selected products produced by one or more of the additional (m+1)-bit multipliers.

6. The system of claim 6 further including:

E. permutation means for permuting bits of the (m+1)-bit representations of elements $\alpha^j$ that are elements of a subset S in which the elements are $\alpha^{k*s}$, with $s=2^{m/2}+1$ and k an integer, the permutation means producing the multiplicative inverse of an element of the subset by raising the element to the power $2^{m/2}$.

7. A method for producing the multiplicative inverses of elements $\alpha^j$ of GF($2^m$), the method including the steps of:

A. determining if an element $\alpha^j$ is also an element of a subset S which has elements that are $\alpha^{k*s}$, with $s=2^{m/2}+1$ and k is an integer;

B. for elements of the subset S, producing the multiplicative inverse by permuting bits of an (m+1)-bit representation of $\alpha^{k*s}$ to produce $(\alpha^{k*s})^{2^{m/2}}$;

C. for $\alpha^j$ not in the subset S, producing $(\alpha^j)^{2^m-2}$.

8. The method of claim 7 wherein the step of producing $(\alpha^j)^{2^m-2}$ includes the steps of i. raising $\alpha^j$ to powers of two;

ii. multiplying together selected elements produced in step i;

iii. raising selected products produced step ii to powers of two;

iv. multiplying together selected products and elements produced in steps i–iii; and v. repeating step iv to produce $(\alpha^j)^{2^m-2}$.

9. The method of claim 8 wherein the steps of raising an element to a power of two is performed by permuting bits of an (m+1)-bit representation of the element.

10. The method of claim 8 wherein the steps of multiplying two elements are performed by cyclically shifting an (m+1)-bit representation of one element, exclusive-OR'ing the shifted bits with bits of the (m+1)-representation of the other element and summing the results.

11. A system for determining a multiplicative inverse of an element $\alpha^j$ of Galois Field GF($2^m$), the system including:

A. first means for manipulating the element $\alpha^j$ to produce one or more products $(\alpha^j)^p$;

B. second means for manipulating the one or more products to produce $(\alpha^j=(\alpha^j)^{2^m-2}$.

12. The system of claim 11 wherein the first means for manipulating multiplies the element $\alpha^j$ by itself to produce the products and the second means for manipulating feeds-back the products to the first means.

13. The system of claim 11 wherein

A. the first means for manipulating raises the element $\alpha^j$ to the powers $2^i$, i=1,2, ... m−1 to produce m−1 products $(\alpha^j)^{2^{m-1}}$, $(\alpha^j)^{2^{m-2}}$, ... $(\alpha^j)^{2^2}$, $(\alpha^j)^2$, and B. the second means for manipulating combines the m−1 products to produce: $(\alpha^j)^{2^m-1}*(\alpha^j)^{2^m-2*} \ldots *(\alpha^j)^{2^2}*(\alpha^j)^2=(\alpha^j)^{2^m-2}=(\alpha^j)^{-1}$.

14. The system of claim 13 wherein the second means for manipulating includes a plurality of multipliers that are arranged in tiers, with the first tier of multipliers multiplying pairs of the m−1 products, and succeeding tiers of multipliers multiplying pairs of the products produced by the preceding tier of multipliers.

15. The system of claim 11 wherein
   A. the first means for manipulating includes:
      a. one or more power-of-two circuits for raising the element $\alpha^j$ to powers of two; and
      b. one or more multipliers for multiplying selected pairs of the results produced by the power-of-two circuits; and
   B. the second means for manipulating includes
      a. one or more additional power-of-two circuits for raising selected products produced by the one or more multipliers to powers of two; and
      b. one or more additional multipliers for producing $(\alpha^j)^{2^m-2}$, the additional multipliers multiplying
         i. selected pairs of the results produced by the additional power-of-two circuits;
         ii. selected results produced by the power-of-two circuits and selected products produced by the one or more multipliers; and
         iii. selected results produced by the additional power-of-two circuits and selected products produced by one or more of the additional multipliers.

16. The system of claim 15 wherein
   i. the first means for manipulating produces a first product $(\alpha^j)^{t^*k}$, and
   ii. the second means for manipulating produces
      a. a second product $[(\alpha^j)^{t^*k}]^{2^{m/2}} = (\alpha^j)^{-t^*k}$, and
      b. a third product $(\alpha^j)^{t^*k} * (\alpha^j)^{t^*k-1} = (\alpha^j)^{-1}$.

17. The system of claim 11 wherein:
   A. the first manipulation means includes
      a. one or more permutation circuits for raising the element $\alpha^j$ to powers of two by permuting bits of a (m+1)-bit representation of the element $\alpha^j$; and
      b. one or more (m+1)-bit multipliers for multiplying selected pairs of the results produced by the permutation circuits; and
   B. the second manipulation means includes
      a. additional permutation circuits for raising selected products produced by the one or more multipliers to powers of two; and
      b. one or more additional (m+1)-bit multipliers for producing $(\alpha^j)^{2^m-2}$, the additional (m+1)-bit multipliers multiplying
         i. selected pairs of the results produced by the additional permutation circuits;
         ii. selected results produced by one or more of the permutation circuits and selected products produced by the one or more (m+1)-bit multipliers;
         iii. selected results produced by the additional permutation circuits and selected products produced by one or more of the additional (m+1)-bit multipliers.

18. The system of claim 17 wherein the second manipulation means further includes permutation means for permuting bits of the (m+1)-bit representations of elements $\alpha^j$ that are elements of a subset S in which the elements are $\alpha^{k*s}$, with $s=2^{m/2}+1$ and k an integer, the permutation means producing the multiplicative inverse of an element of the subset by raising the element to the power $2^{m/2}$.

* * * * *